(12) United States Patent
Tillotson

(10) Patent No.: US 11,143,628 B2
(45) Date of Patent: Oct. 12, 2021

(54) JOINT INSPECTION SYSTEM AND METHODS OF INSPECTING A JOINT IN A STRUCTURE

(71) Applicant: The Boeing Company, Chicago, IL (US)

(72) Inventor: Brian Jay Tillotson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 16/512,113

(22) Filed: Jul. 15, 2019

(65) Prior Publication Data

US 2021/0018471 A1   Jan. 21, 2021

(51) Int. Cl.
*G01N 29/24* (2006.01)

(52) U.S. Cl.
CPC . *G01N 29/2431* (2013.01); *G01N 2291/0289* (2013.01); *G01N 2291/02827* (2013.01); *G01N 2291/267* (2013.01)

(58) Field of Classification Search
CPC .. G01N 29/2431; G01N 29/223; G01N 29/11; G01N 29/48; G01N 29/4427; G01N 29/07; G01N 2291/02827; G01N 2291/0289; G01N 2291/267; G01N 2291/015; G01N 2291/011
See application file for complete search history.

(56) References Cited

U.S. PATENT DOCUMENTS

| 4,543,486 A * | 9/1985 | Rose | B23K 26/03 219/121.14 |
| 2013/0181125 A1* | 7/2013 | Guna | H01J 49/0031 250/282 |
| 2016/0091463 A1* | 3/2016 | Barry | G01B 17/02 73/632 |

OTHER PUBLICATIONS

Extended European Search Report, dated Nov. 20, 2020, regarding EP Application No. 20184858.7, 5 pages.
Kambara, "Detection of acoustic signals induced by heavy-ion impact: ion-beam seismology," Nuclear Instruments and Methods in Physics Research B, vol. 230, No. 1-4, Apr. 1, 2005, pp. 601-607.
Lehrack et al., "Ionoacoustic detection of swift heavy ions," Arxiv. org; Cornell University Library, Mar. 28, 2019, 22 pages.
Kambara, "Sound wave generated by swift heavy ions," Nuclear Instruments & Methods in Physics Research B, vol. 245, No. 1, Apr. 1, 2006, pp. 108-113.

* cited by examiner

*Primary Examiner* — Suman K Nath
(74) *Attorney, Agent, or Firm* — Yee & Associates, P.C.

(57) ABSTRACT

A joint inspection system and methods of inspecting a joint in a structure are presented. In a method, an ion beam is sent, by an ion beam source, into a first surface of the structure to form an acoustic pulse source in the structure at a depth corresponding to a Bragg peak of the ion beam, wherein acoustic pulse source is adjacent to the joint. A travel time and a magnitude of an acoustic pulse generated by the acoustic pulse source is sensed, by an acoustic sensor positioned at a second surface of the structure, to thereby form a response, wherein the joint is between the acoustic pulse source and the second surface.

20 Claims, 6 Drawing Sheets

JOINT INSPECTION SYSTEM AND METHODS OF INSPECTING A JOINT IN A STRUCTURE

BACKGROUND INFORMATION

1. Field

The present disclosure relates generally to non-destructive inspection, and more specifically to inspecting joints in structures.

2. Background

Welding and adhesives are common methods of joining objects. When objects are joined, a joint is formed at the interface between the objects. Joints between two objects may be tested or inspected to verify the joint strength. However, it is undesirably difficult to find voids in welds or unbonded sections of a bonded joint.

Therefore, it would be desirable to have a method and apparatus that takes into account at least some of the issues discussed above, as well as other possible issues.

SUMMARY

An illustrative embodiment of the present disclosure provides a method of inspecting a joint in a structure. An ion beam is sent, by an ion beam source, into a first surface of the structure to form an acoustic pulse source in the structure at a depth corresponding to a Bragg peak of the ion beam. The acoustic pulse source is adjacent to the joint. A travel time and a magnitude of an acoustic pulse generated by the acoustic pulse source is sensed, by an acoustic sensor positioned at a second surface of the structure, to thereby form a response, wherein the joint is between the acoustic pulse source and the second surface.

Another illustrative embodiment of the present disclosure provides a joint inspection system. The joint inspection system comprises an ion beam source and an acoustic sensor positioned to receive acoustic pulses formed from energy of an ion beam originating from the ion beam source.

Yet another illustrative embodiment of the present disclosure provides a method of inspecting a joint in a structure. Ion beams are repeatedly sent into a first surface of the structure to form acoustic pulse sources within a first portion of the structure on a first side of the joint. A travel time and a magnitude of acoustic pulses generated by the acoustic pulse sources are sensed, at a second surface of a second portion of the structure, to thereby form responses. The joint is an interface between the first portion and the second portion of the structure. It is determined if an inconsistency is present in the joint based on the responses.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that some bonds or joints are not currently verifiable by conventional non-destructive inspection methods. The illustrative examples recognize and take into account that X-rays do not penetrate far enough to verify joints in large structures. The illustrative examples recognize and take into account that X-rays have limited penetration in dense material. Another limitation of X-ray inspection is undesirably low depth resolution unless tomographic techniques are used. However, tomographic techniques add processing time.

The illustrative examples recognize and take into account that ultrasound sensitivity and resolution for thick objects may be undesirably low. The illustrative examples recognize and take into account that ultrasound sensitivity and resolution may be dependent on the material of the structure.

The illustrative examples recognize and take into account that, in conventional ultrasound inspection, a transducer creates an acoustic pulse at the surface. Acoustic energy initially travels along direct paths. If the weld or bond is free of inconsistencies, these direct paths go straight to the acoustic sensor on the other surface. If there is an inconsistency in the weld or bond, the acoustic paths cannot go straight to the sensor. Instead, scattered acoustic energy from the inconsistency goes to the sensor, creating an intensity profile that is not greatly different than the acceptable profile. The physics of the situation limits sensitivity to inconsistencies in traditional ultrasonic inspection.

For ultrasound inspection, transducers may be used to enhance at least one of ultrasound sensitivity or resolution. The illustrative examples recognize and take into account that using transducers adds cost and labor. Additionally, ultrasound inspection may not be able to verify some combinations of material, shape, and thickness.

Figure 1:
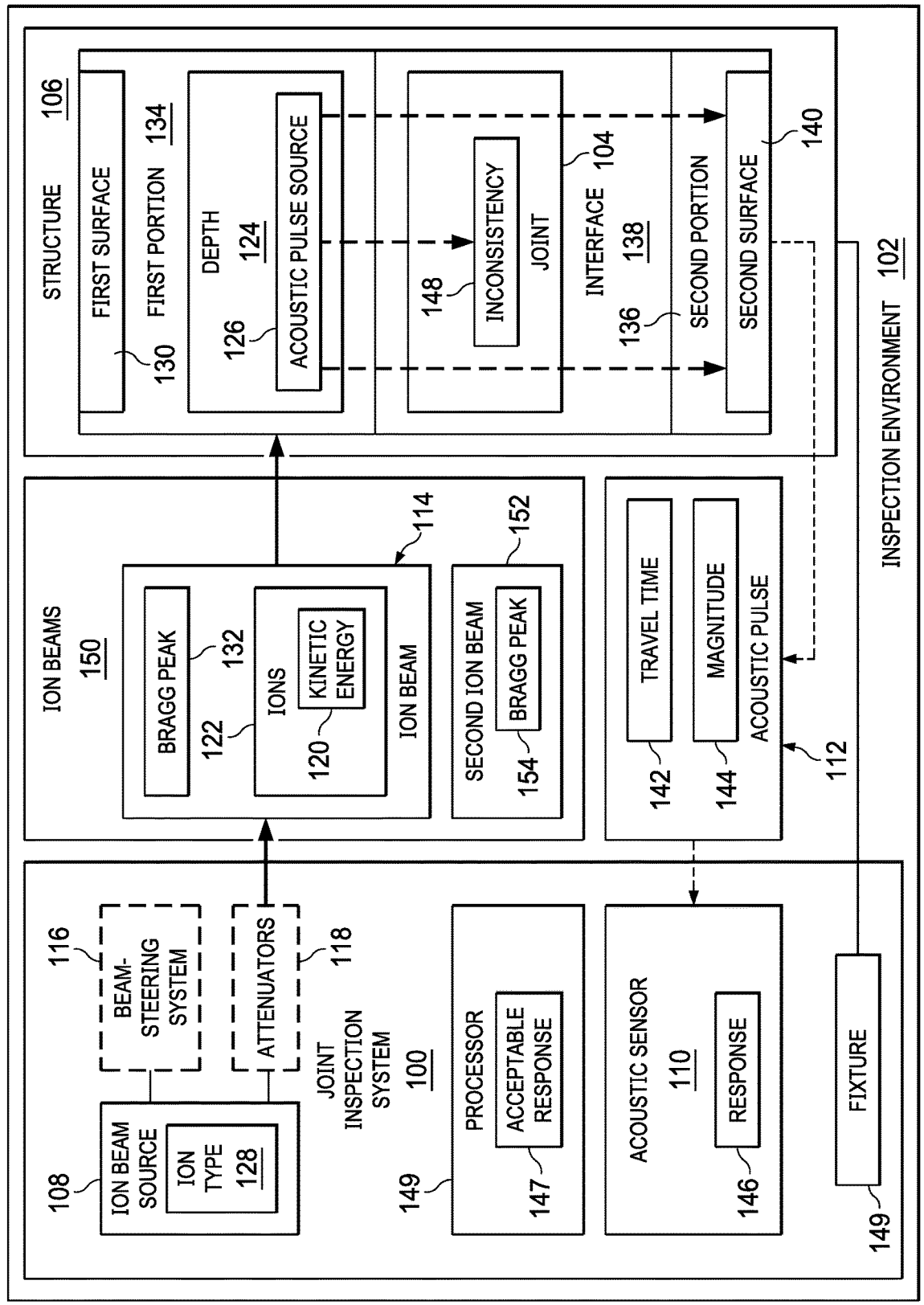
FIG. 1 is an illustration of a block diagram of an inspection environment in which a joint inspection system operates in accordance with an illustrative embodiment.

Turning now to FIG. 1, an illustration of a block diagram of an inspection environment in which a joint inspection system operates is depicted in accordance with an illustrative embodiment. Joint inspection system 100 in inspection environment 102 is configured to inspect joint 104 of structure 106. Joint inspection system 100 comprises ion beam source 108 and acoustic sensor 110. Ion beam source 108 is directed toward acoustic sensor 110. Acoustic sensor 110 is positioned to receive acoustic pulses 112 formed from energy of ion beam 114 originating from ion beam source 108.

Kinetic energy 120 in ion beam 114 is deposited within a short distance in structure 106. Kinetic energy 120 is converted to thermal energy which produces thermal expansion within acoustic pulse source 126. The thermal expansion of acoustic pulse source 126 produces acoustic pulse 112.

Ion beam source 108 generates ion beam 114. Ion beam 114 generates acoustic pulse 112 within structure 106. Ion beam source 108 takes any desirable form. In some illustrative examples, ion beam source 108 is one of a cyclotron, a van de Graff generator, or a linear accelerator.

In some illustrative examples, joint inspection system 100 also includes beam-steering system 116 configured to change a shape of ion beam 114. In some illustrative examples, beam-steering system 116 is optional.

In some illustrative examples, attenuators 118 are positioned between ion beam source 108 and a target of ion beam source 108. As depicted, structure 106 is the target of ion beam source 108. In these illustrative examples, attenuators 118 are positioned between ion beam source 108 and structure 106. Attenuators 118 are optional. When present, attenuators 118 control kinetic energy 120 of ions 122 of ion beam 114. Controlling kinetic energy 120 of ions 122 of ion beam 114 adjusts depth 124 of the acoustic pulse source 126 in structure 106.

In some illustrative examples, kinetic energy 120 of ions 122 of ion beam 114 is controlled by adjusting ion beam source 108. In some illustrative examples, ion beam source 108 is adjusted by changing ion type 128.

In operation, ion beam source 108 sends ion beam 114 into structure 106. Ion beam 114 is sent, by ion beam source 108, into first surface 130 of structure 106 to form acoustic pulse source 126 in structure 106 at depth 124 corresponding to Bragg peak 132 of ion beam 114. Depth 124 is selected to form acoustic pulse source 126 adjacent to joint 104. In some illustrative examples, depth 124 is between first surface 130 and joint 104.

First surface 130 is part of first portion 134 of structure 106. First portion 134 is joined to second portion 136 of structure 106 at joint 104. Joint 104 is present at interface 138 between first portion 134 and second portion 136 of structure 106.

Acoustic sensor 110 is positioned at second surface 140 of structure 106. Travel time 142 and magnitude 144 of acoustic pulse 112 generated by acoustic pulse source 126 are received at acoustic sensor 110 to thereby form response 146. Joint 104 is between first surface 130 and second surface 140. Joint 104 is between acoustic pulse source 126 and second surface 140.

Response 146 is compared to acceptable response 147. An inconsistency is identified if response 146 has a magnitude outside acceptable response 147. For example, if inconsistency 148 is between acoustic pulse source 126 and acoustic sensor 110, magnitude 144 may be outside of acceptable response 147. If inconsistency 148 is between acoustic pulse source 126 and acoustic sensor 110, some of acoustic pulse 112 will be blocked by inconsistency 148. Inconsistency 148 blocking portions of acoustic pulse 112 reduces magnitude 144 of acoustic pulse 112 received by acoustic sensor 110.

In some illustrative examples, response 146 is compared to acceptable response 147 by a human operator. In other illustrative examples, response 146 is compared to acceptable response 147 by processor 149.

In this illustrative example, the comparison may be performed by processor 149 using computer-implemented instructions. In some cases, processor 149 may take the form of a hardware unit, such as a circuit system, an application specific integrated circuit (ASIC), a programmable logic device, or some other suitable type of hardware unit.

As another example, if inconsistency 148 is between acoustic pulse source 126 and acoustic sensor 110, travel time 142 may be outside of the acceptable response. If inconsistency 148 is between acoustic pulse source 126 and acoustic sensor 110, acoustic pulse 112 is scattered by inconsistency 148. Inconsistency 148 scattering acoustic pulse 112 may increase travel time 142 of acoustic pulse 112 received by acoustic sensor 110.

Joint inspection system 100 repeatedly sends ion beams 150 into structure 106 to inspect joint 104. In some illustrative examples, joint inspection system 100 steps ion beams 150 across first surface 130 to inspect different locations of joint 104 in structure 106.

In some illustrative examples, joint inspection system 100 sends ion beams 150 having different kinetic energies into structure 106. For example, joint inspection system 100 may send, by ion beam source 108, second ion beam 152 into first surface 130 of structure 106 to form a second acoustic pulse source in structure 106 at a second depth corresponding to Bragg peak 154 of second ion beam 152. A kinetic energy of ions of second ion beam 152 adjusts the second depth of the acoustic pulse source prior to said sending second ion beam 152 into structure 106 such that the second depth is different from depth 124. By sending ion beams 150 having different kinetic energies into structure 106, different sides of joint 104 may be tested.

Acoustic sensor 110 positioned at second surface 140 senses a travel time and a magnitude of an acoustic pulse generated by the second acoustic pulse source to thereby form a second response. In some illustrative examples, response 146 and second response are from opposite sides of interface 138.

In some illustrative examples, fixture 149 holds structure 106 during inspection. In some illustrative examples, fixture 149 holds structure 106 to be inspected between ion beam source 108 and acoustic sensor 110. In some illustrative examples, fixture 149 is configured to hold structure 106 to be inspected in a path of ion beam source 108 and in acoustic contact with acoustic sensor 110.

The illustration of inspection environment 102 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, fixture 149 is configured to place structure 106 into tension. When fixture 149 places structure 106 into structural tension, unbonded sections of joint 104 may be detected. By placing structure 106 under tension, joint 104 within structure 106 is placed under tension. By placing joint 104 under tension, any unbonded spots at joint 104 will widen. Widening unbonded spots increases scattering of acoustic pulse 112. By placing structure 106 under tension, joint inspection system 100 may more easily identify unbonded sections of joint 104 in structure 106.

As another example, although processor 149 is depicted as being within inspection environment 100, processor 149 may be located in any desirable location. For example, processor 149 may be part of a computer system outside of inspection environment 100.

Figure 2:
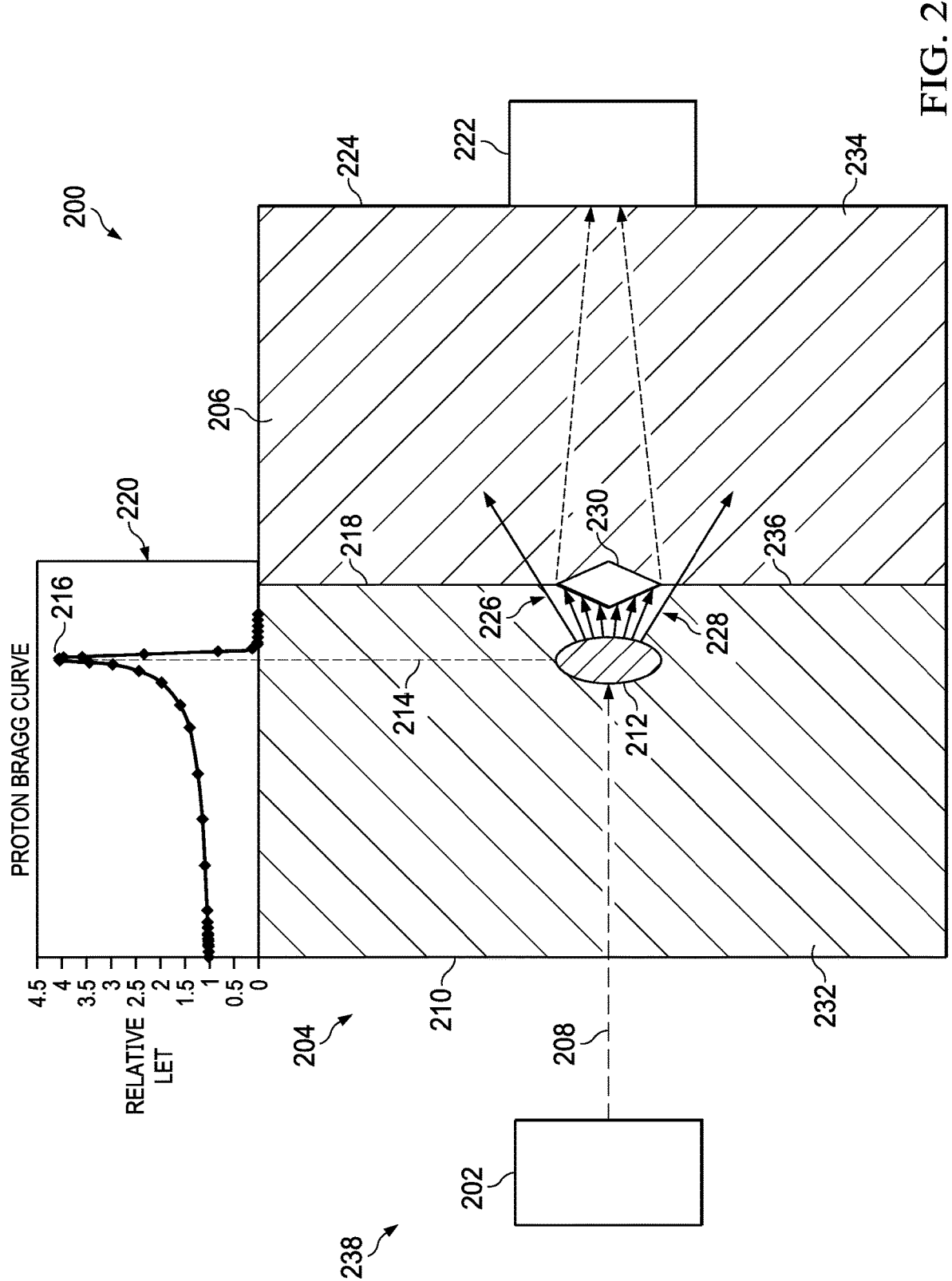
FIG. 2 is an illustration of a cross-sectional view of a joint during inspection in accordance with an illustrative embodiment.

Turning now to FIG. 2, an illustration of a cross-sectional view of a joint during inspection is depicted in accordance with an illustrative embodiment. In view 200, ion beam source 202 is positioned on first side 204 of structure 206. Ion beam source 202 is a physical implementation of ion beam source 108 of FIG. 1. Ion beam source 202 is directed toward structure 206.

Ion beam source 202 is configured to send ion beam 208 into first surface 210 on first side 204 of structure 206. By sending ion beam 208 into first surface 210 of structure 206, acoustic pulse source 212 is formed in structure 206 at depth 214. Depth 214 corresponds to Bragg peak 216 of ion beam 208. As depicted, depth 214 is between first surface 210 and joint 218. Depth 214 is selected to form acoustic pulse source 212 adjacent to joint 218.

Graph 220 with Bragg peak 216 is presented to demonstrate the energy loss of ion beam 208 as it travels through structure 206. Bragg peak 216 occurs immediately prior to ions of ion beam 208 coming to rest. Bragg peak 216 occurs immediately prior to depth 214. At Bragg peak 216 a large fraction of the kinetic energy in ion beam 208 is deposited within a short distance in structure 206. The kinetic energy is converted to thermal energy which produces thermal expansion within acoustic pulse source 212. The thermal expansion of acoustic pulse source 212 produces acoustic pulse 226.

A kinetic energy of the ions in ion beam 208 is controlled to adjust depth 214 of acoustic pulse source 212. The kinetic energy is controlled by adjusting ion beam source 202 or inserting attenuators (not depicted) between ion beam source 202 and structure 206.

Acoustic sensor 222 is positioned at second surface 224 of structure 206. Acoustic sensor 222 is positioned to receive acoustic pulses originating within structure 206. The acoustic pulses are generated by thermal expansion created by ion beam 208 of ion beam source 202. Joint 218 is between first surface 210 and second surface 224. Acoustic pulse 226 is generated by acoustic pulse source 212. Acoustic sensor 222 senses a travel time and a magnitude of acoustic pulse 226 generated by acoustic pulse source 212. Sensing a travel time and a magnitude of acoustic pulse 226 generated by acoustic pulse source 212 forms a response. As depicted, acoustic pulse 226 is represented by plurality of arrows 228.

As depicted, some of plurality of arrows 228 are blocked by inconsistency 230. This indicates portions of acoustic pulse 226 that are blocked by inconsistency 230. Due to inconsistency 230 blocking acoustic pulse 226, at least one of the magnitude or the travel time of acoustic pulse 226 received at acoustic sensor 222 is affected by presence of inconsistency 230.

Inconsistency 230 in joint 218 is a void. Joint 218 is a connection between first portion 232 of structure 206 and second portion 234 of structure 206 at interface 236 of first portion 232 and second portion 234.

Joint inspection system 238 comprises ion beam source 202 and acoustic sensor 222. Ion beam source 202 is directed toward acoustic sensor 222. Acoustic sensor 222 is positioned to receive acoustic pulses formed from energy of ion beam 208 originating from the ion beam source 202.

Joint inspection system 238 comprises ion beam source 202 directed toward structure 206 and acoustic sensor 222. Acoustic sensor 222 is positioned to receive acoustic pulses originating within structure 206. Acoustic pulses, including acoustic pulse 226, are generated by thermal expansion created by ion beam 208 of ion beam source 202.

Sending ion beam 208 into structure 206 enables non-destructive inspection of joint 218 of structure 206. The non-destructive inspection of joint 218 is performed by joint inspection system 238. As depicted, joint inspection system 238 includes ion beam source 202 and acoustic sensor 222. However, other components may be present in joint inspection system 238.

The illustration of joint inspection system 238 in FIG. 2 is not meant to imply physical or architectural limitations to the manner in which an illustrative embodiment may be implemented. Other components in addition to or in place of the ones illustrated may be used. Some components may be unnecessary.

For ease of illustration, ion beam source 202 is represented by a box. However, ion beam source 202 takes any desirable form. In some illustrative examples, ion beam source 202 is one of a cyclotron, a van de Graff generator, or a linear accelerator. Although ion beam source 202 is depicted as sending ion beam 208 toward acoustic sensor 222, ion beam 208 is sent into structure 206 at any desirable angle.

In some illustrative examples, attenuators (not depicted) are positioned between ion beam source 202 and structure 206. In some illustrative examples, a fixture (not depicted) holds structure 206. In some illustrative examples, the fixture places structure 206 into tension.

Figure 3:
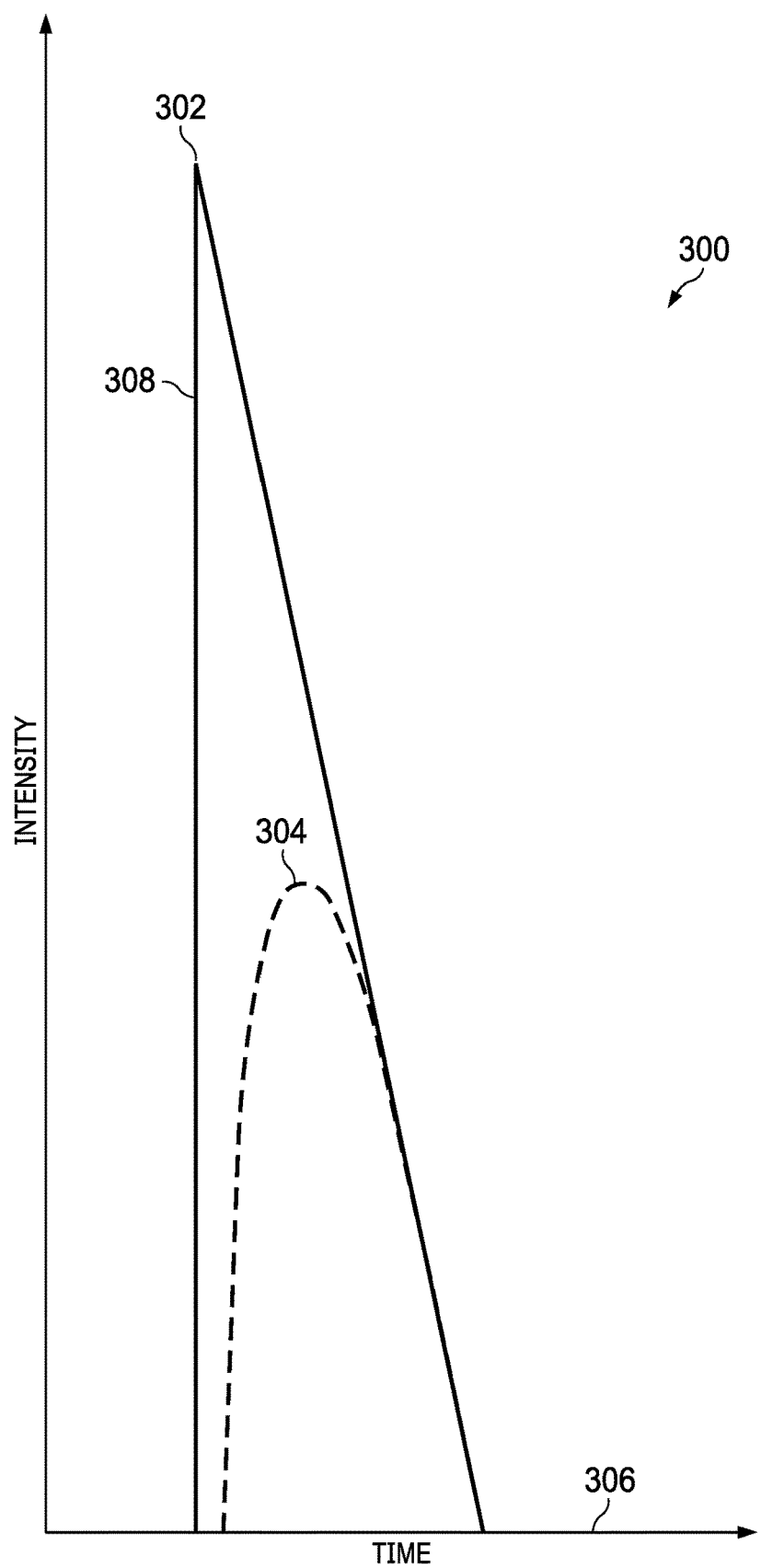
FIG. 3 is an illustration of an intensity graph of responses from a joint inspection in accordance with an illustrative embodiment.

Turning now to FIG. 3, an illustration of an intensity graph of responses from a joint inspection is depicted in accordance with an illustrative embodiment. Graph 300 has response 302 and response 304. Response 302 is an acceptable response. Response 302 is generated by an acoustic pulse traveling through a structure with an acceptable level of inconsistencies. Response 304 is generated by an acoustic pulse that encounters an unacceptable level of inconsistencies while traveling through a structure. In some illustrative examples, response 304 is a physical representation of response 146 of FIG. 1 generated by receiving acoustic pulse 112.

Graph 300 has x-axis 306 of time. Graph 300 has y-axis 308 of intensity. X-axis 306 is a measure of travel time, such as travel time 142 of FIG. 1. Y-axis 308 is an indication of magnitude, such as magnitude 144 of FIG. 1.

Figure 4:
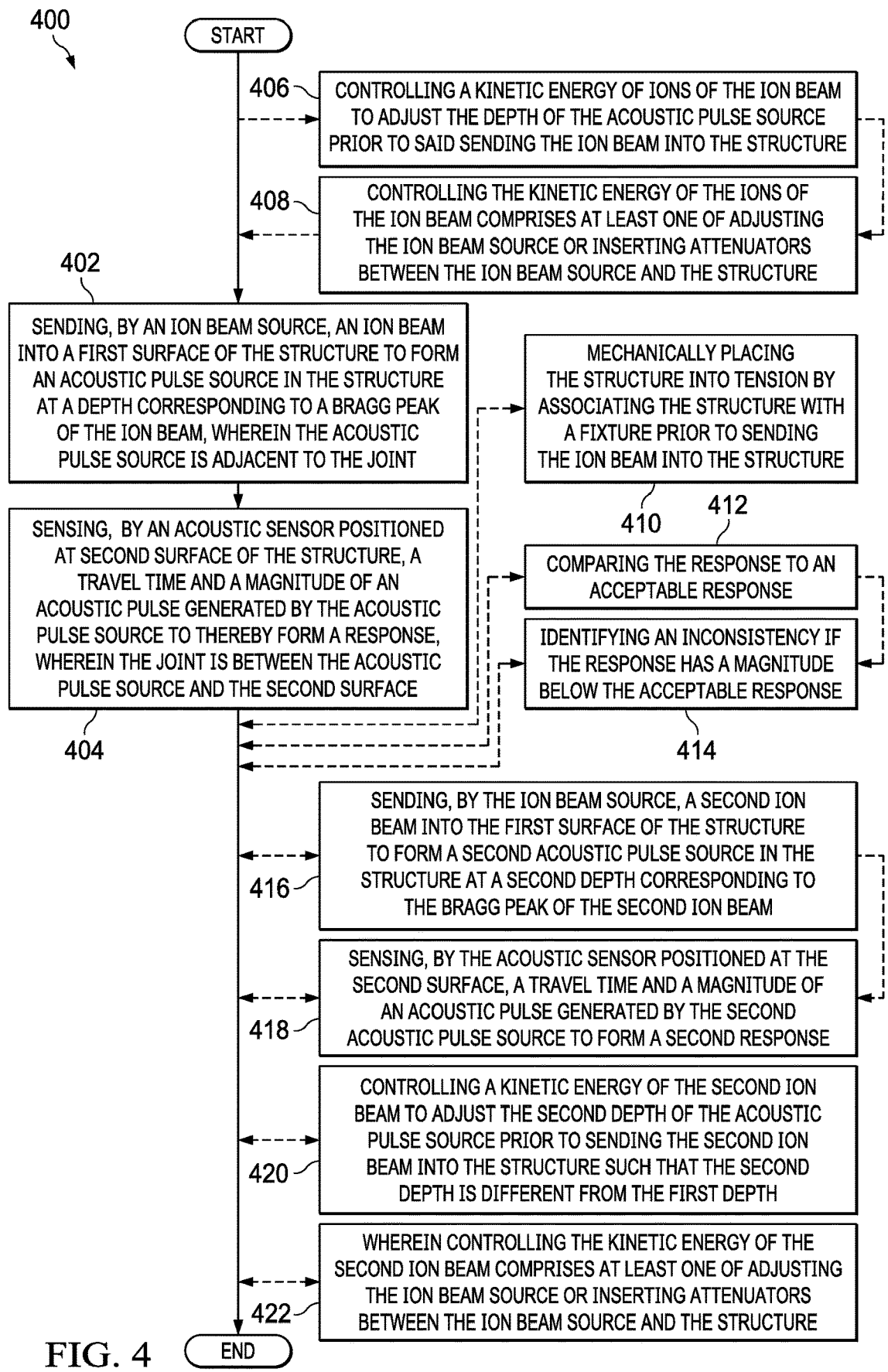
FIG. 4 is an illustration of a flowchart of a method of inspecting a joint in a structure in accordance with an illustrative embodiment.

Turning now to FIG. 4, an illustration of a flowchart for a method of inspecting a joint in a structure is depicted in accordance with an illustrative embodiment. Method 400 may be performed using joint inspection system 100 of FIG. 1. Method 400 may be performed using ion beam source 202 and acoustic sensor 222 of FIG. 2. In some illustrative examples, response 302 or response 304 is a physical representation of a response generated by method 400.

Method 400 sends, by an ion beam source, an ion beam into a first surface of the structure to form an acoustic pulse source in the structure at a depth corresponding to a Bragg peak of the ion beam, wherein the acoustic pulse source is adjacent to the joint (operation 402). Method 400 senses, by an acoustic sensor positioned at a second surface of the structure, a travel time and a magnitude of an acoustic pulse generated by the acoustic pulse source to thereby form a response, wherein the joint is between the acoustic pulse source and the second surface (operation 404). Afterwards, method 400 terminates.

In some illustrative examples, method 400 controls a kinetic energy of the ions in the ion beam to adjust the depth of the acoustic pulse source prior to said sending the ion beam into the structure (operation 406). In some illustrative examples, controlling the kinetic energy of the ions of the ion beam comprises at least one of adjusting the ion beam source or inserting attenuators between an ion beam source and the structure (operation 408). In some illustrative examples, the depth is between the first surface and the joint.

In some illustrative examples, method 400 mechanically places the structure into tension by associating the structure with a fixture prior to sending the ion beam into the structure (operation 410). Placing the structure into tension allows for testing the strength of bonds.

Method 400 compares the response to an acceptable response (operation 412) and identifies an inconsistency if the response has a magnitude outside the acceptable response (operation 414). In some illustrative examples, the response has a magnitude significantly lower than an acceptable response. In these illustrative examples, if the response has a magnitude significantly lower than the acceptable response, the inconsistency is identified. The inconsistency is identified if the inconsistency is out of tolerance.

In some illustrative examples, the acceptable response is selected such that a response having the magnitude equal to or greater than the acceptable response is associated with a joint having an acceptable strength. A response having a magnitude equal to or greater than the acceptable response has a quantity of inconsistencies and size of inconsistencies that are within tolerance. The acceptable response is selected such that a response having the magnitude equal to or greater than the acceptable response is associated with a joint having an acceptable level of inconsistencies.

In some illustrative examples, method 400 sends, by the ion beam source, a second ion beam into the first surface of the structure to form a second acoustic pulse source in the structure at a second depth corresponding to a Bragg peak of the second ion beam (operation 416). In these illustrative examples, method 400 senses, by the acoustic sensor positioned at the second surface, a travel time and a magnitude of an acoustic pulse generated by the second acoustic pulse source to thereby form a second response (operation 418).

In some illustrative examples, method 400 controls a kinetic energy of ions of the second ion beam to adjust the second depth of the acoustic pulse source prior to said sending the second ion beam into the structure such that the second depth is different from the first depth (operation 420). In some illustrative examples, controlling the kinetic energy of ions of the second ion beam comprises at least one of adjusting the ion beam source or inserting attenuators between the ion beam source and the structure (operation 422).

Figure 5:
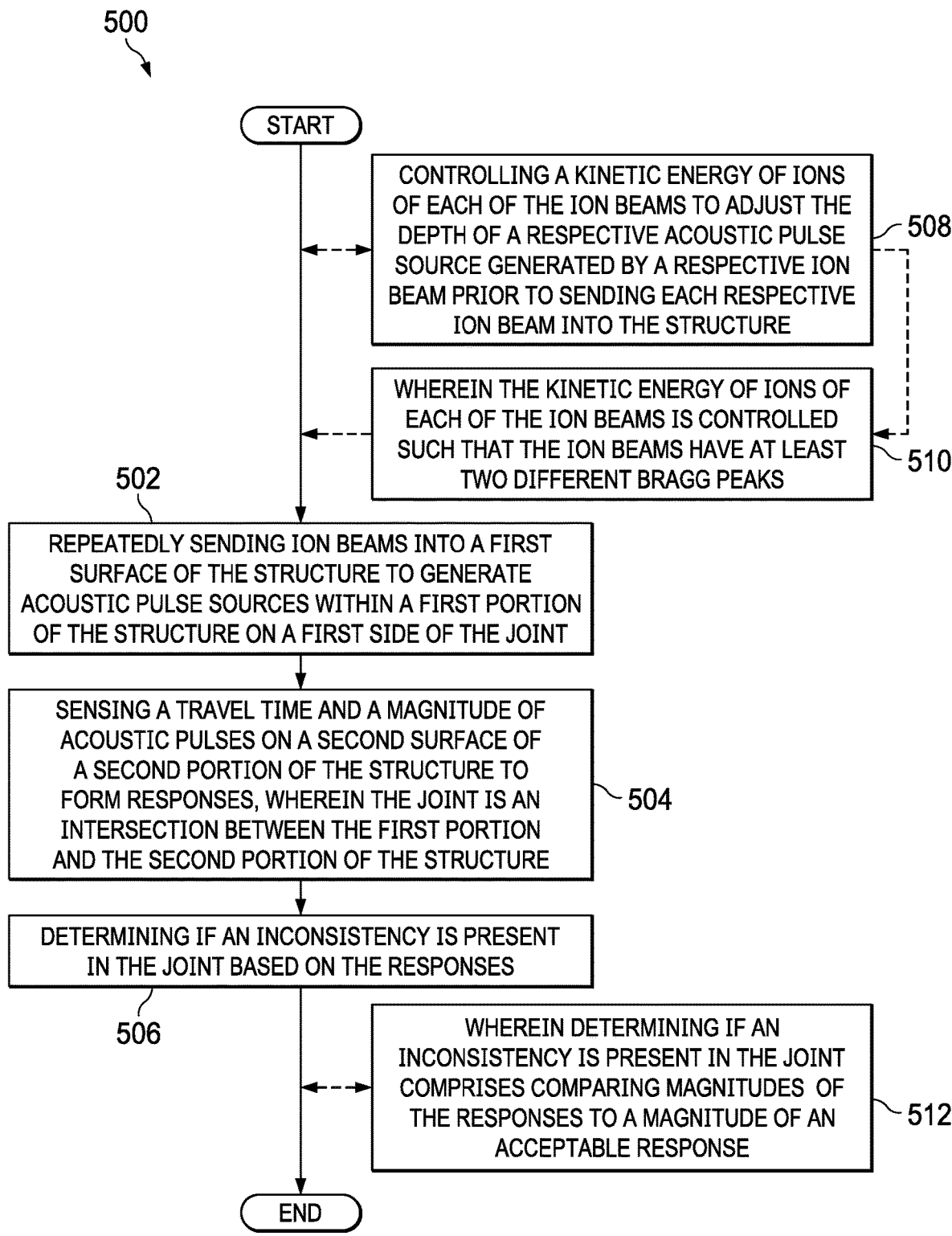
FIG. 5 is an illustration of a flowchart of a method of inspecting a joint in a structure in accordance with an illustrative embodiment.

Turning now to FIG. 5, an illustration of a flowchart for a method of inspecting a joint in a structure is depicted in accordance with an illustrative embodiment. Method 500 may be performed using joint inspection system 100 of FIG. 1. Method 500 may be performed using ion beam source 202 and acoustic sensor 222 of FIG. 2. In some illustrative examples, response 302 or response 304 is a physical representation of a response generated by method 500.

Method 500 repeatedly sends ion beams into a first surface of the structure to form acoustic pulse sources within a first portion of the structure on a first side of the joint (operation 502). Method 500 senses, at a second surface of a second portion of the structure, a travel time and a magnitude of acoustic pulses generated by the acoustic pulse sources to thereby form responses, wherein the joint is an interface between the first portion and the second portion of the structure (operation 504). Method 500 determines if an inconsistency is present in the joint based on the responses (operation 506). Afterwards, method 500 terminates.

In some illustrative examples, method 500 controls a kinetic energy of ions of each of the ion beams to adjust the depth of a respective acoustic pulse source generated by a respective ion beam prior to said sending each respective ion beam into the structure (operation 508). In some illustrative examples, the kinetic energy of ions of each of the ion beams is controlled such that the ion beams have at least two different Bragg peaks (operation 510). By the ion beams having at least two different Bragg peaks, ions deposit energy at at least two different depths within a structure. By depositing energy at different depths, acoustic pulse sources are generated at different depths.

In some illustrative examples, determining if an inconsistency is present in the joint comprises comparing magnitudes of the responses to a magnitude of an acceptable response (operation 512). The magnitude of the acceptable response is generated using inspections of structures having a same design and an acceptable quality. The magnitude of the acceptable response is selected such that all responses that meet or exceed the magnitude of the acceptable response are within tolerance.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, some operations of operation 406 through operation 422 may be optional. As another example, some operations of operation 508 through operation 512 may be optional.

Figure 6:
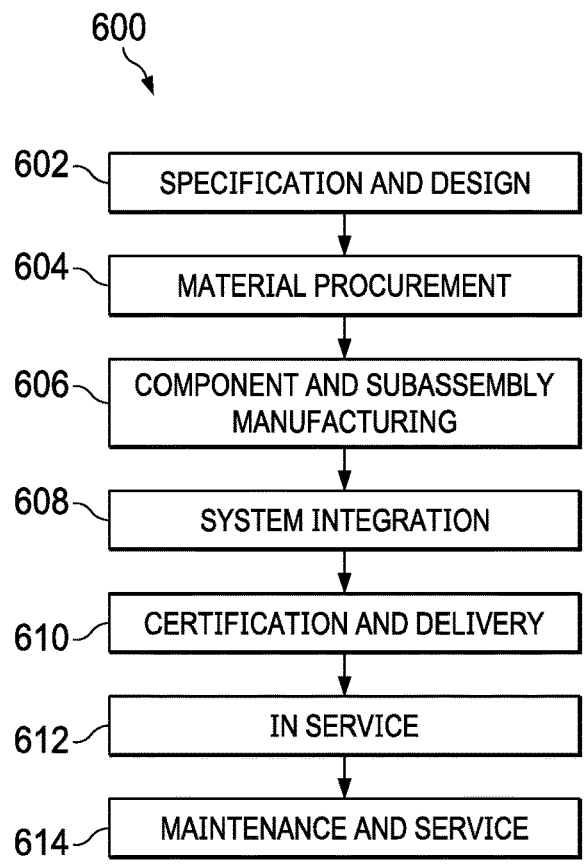
FIG. 6 is an illustration of an aircraft manufacturing and service method in a form of a block diagram in accordance with an illustrative embodiment.
Figure 7:
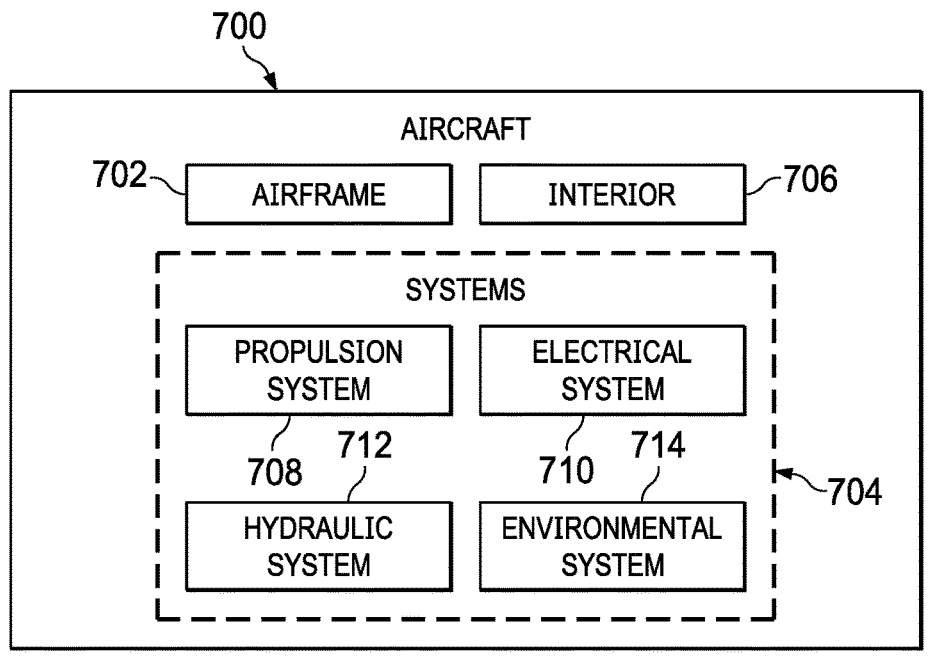
FIG. 7 is an illustration of an aircraft in a form of a block diagram in which an illustrative embodiment may be implemented.

Illustrative embodiments of the present disclosure may be described in the context of aircraft manufacturing and service method 600 as shown in FIG. 6 and aircraft 700 as shown in FIG. 7. Turning first to FIG. 6, an illustration of an aircraft manufacturing and service method is depicted in accordance with an illustrative embodiment. During preproduction, aircraft manufacturing and service method 600 may include specification and design 602 of aircraft 700 in FIG. 7 and material procurement 604.

During production, component and subassembly manufacturing 606 and system integration 608 of aircraft 700 takes place. Thereafter, aircraft 700 may go through certification and delivery 610 in order to be placed in service 612. While in service 612 by a customer, aircraft 700 is scheduled for routine maintenance and service 614, which may include modification, reconfiguration, refurbishment, or other maintenance and service.

Each of the processes of aircraft manufacturing and service method 600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 7, an illustration of an aircraft is depicted in which an illustrative embodiment may be implemented. In this example, aircraft 700 is produced by aircraft manufacturing and service method 600 of FIG. 6 and may include airframe 702 with plurality of systems 704 and interior 706. Examples of systems 704 include one or more of propulsion system 708, electrical system 710, hydraulic system 712, and environmental system 714. Any number of other systems may be included.

Apparatuses and methods embodied herein may be employed during at least one of the stages of aircraft manufacturing and service method 600. One or more illustrative embodiments may be manufactured or used during at least one of component and subassembly manufacturing 606, system integration 608, in service 612, or maintenance and service 614 of FIG. 6. For example, inspection of structure 106 using joint inspection system 100 may be performed during component and subassembly manufacturing 606. In some illustrative examples, inspection of structure 106 using joint inspection system 100 is performed during maintenance and service 612. As an example, method 400 or method 500 may be used during component and subassembly manufacturing 606 to inspect joint 104. Structure 106 may be a component of aircraft 700 such as a component of airframe 702 or interior 706.

The illustrative examples present a joint inspection system and method of inspecting a joint. The illustrative examples position an ultrasound source at a selected depth inside a structure. A mono-energetic beam of ions, such as protons, passes through material and deposits most of its energy at a specific depth called the Bragg peak. A burst of ions delivers a sharp pulse of heat to a small volume inside a structure to be tested. The thermal pulse creates an acoustic pulse which travels to the surface of the structure. Acoustic sensors on the surface assess the travel time and the magnitude of the acoustic pulse. The travel time and the magnitude of the acoustic pulse reveal inconsistencies such as voids or unbonded areas. In some illustrative examples, the structure is placed under structural tension prior to sending an ion beam into the structure.

Varying the ion energy allows the acoustic pulse to be created at selected depths. The energy lets us slide the acoustic pulse source from one side of a joint to the other, giving enhanced sensitivity to any weak spots.

The joint inspection system has an acoustic sensor to measure acoustic signals in a structure, and an ion beam source, such as a cyclotron or van de Graff generator. A structure to be inspected is provided. In some illustrative examples, a fixture to hold the structure in the ion beam is provided. In some illustrative examples, the fixture may also hold attenuators. In these illustrative examples, the attenuators are provided to control the energy of ions entering the object.

To inspect a structure, the structure is placed in the fixture. The structure is oriented so a desired part of the structure is in the ion beam path. Acoustic sensors are placed on the surface of the structure. The the kinetic energy of ions is set. The kinetic energy of the ions is adjusted by adjusting the ion beam source or by inserting attenuators between the ion beam source and the structure. The ion beam source fires a pulse of mono-energetic ions, such as protons. The ion pulse enters the structure and deposits most of its energy at a specific depth called the Bragg peak. Depositing most of the energy at a specific depth creates a sharp pulse of heat in a small volume. That volume expands slightly but quickly, creating an acoustic pulse which travels to the surface of the structure. At least one acoustic sensor on the surface record the travel time and the magnitude of the acoustic pulse.

At least one of a human operator or a computer compares the acoustic travel time and/or magnitude to reference values. The reference values include at least one of acceptable values or unacceptable values. If the pulse from inside the structure arrives later and/or weaker than it would for a structure of the same type having a desired quality, this is evidence of an undesirable amount of inconsistencies, such as voids or unbonded areas. If the pulse from inside the structure arrives later and/or weaker than it would for a structure of acceptable amount of inconsistencies, this is evidence of out of tolerance inconsistencies.

Varying the energy of ions of the ion beam allows the acoustic pulse to be created at selected depths. The illustrative examples allow for inspection of thicker structures than x-ray inspection. With the chirping technique, in which ion beams of different kinetic energies are sent to the same location, the joint inspection system offers superior depth resolution over conventional inspections.

The illustrative examples provide for superior resolution and sensitivity to conventional ultrasound inspection. The illustrative examples use ultrasound, but because the ultrasound pulse is created inside the structure near the area to be inspected, the joint inspection system in the illustrative examples offers superior resolution and sensitivity with fewer transducers.

Energy deposition vs. depth is specific for ions in the ion beam. There is a sharp peak of energy deposition. This narrow deposition at depth provides an advantage.

In the illustrative examples, no acoustic transducer creates a pulse. Instead, the pulse of ions enters the object. The ions deposit some energy in the initial part of their path, but deposit most in a narrow range of depth at the Bragg peak. Depositing the energy at the Bragg peak generates an acoustic pulse source inside the object. Acoustic energy travels from the ion beam (pulse) source along direct paths. If there is an inconsistency, most direct paths quickly encounter it.

Compared to conventional ultrasound inspection, a much higher fraction of the acoustic energy is scattered by the inconsistency. Compared to conventional ultrasound inspection, the acoustic sensor of the joint inspection system measures a greater difference between responses for a structure having an out of tolerance inconsistency and a structure having no out of tolerance inconsistency. The physics of the inspection process provides higher sensitivity to inconsistencies than in conventional ultrasound inspection.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of inspecting a joint in a structure, the method comprising:
    sending, by an ion beam source, an ion beam into a first surface of the structure to form an acoustic pulse source in the structure at a depth corresponding to a Bragg peak of the ion beam, wherein the acoustic pulse source is adjacent to the joint;
    sensing, by an acoustic sensor positioned at a second surface of the structure, a travel time and a magnitude of an acoustic pulse generated by the acoustic pulse source to thereby form a response, wherein the joint is between the acoustic pulse source and the second surface; and
    identifying an inconsistency in the joint via identifying at least one of the travel time or the magnitude as being outside of an acceptable response.

2. The method of claim 1, further comprising:
    controlling a kinetic energy of ions in the ion beam to adjust the depth of the acoustic pulse source prior to said sending the ion beam into the structure.

3. The method of claim 2, wherein said controlling a kinetic energy of the ions in the ion beam comprises at least one of adjusting the ion beam source or inserting attenuators between the ion beam source and the structure.

4. The method of claim 1, further comprising:
    mechanically placing the structure into tension by associating the structure with a fixture prior to sending the ion beam into the structure.

5. The method of claim 1, further comprising:
    establishing the acceptable response using a second structure, of a same design as the structure, that comprises an acceptable quality.

6. The method of claim 1, further comprising:
    sending, by the ion beam source, a second ion beam into the first surface of the structure to form a second acoustic pulse source in the structure at a second depth corresponding to a Bragg peak of the second ion beam; and
    sensing, by the acoustic sensor positioned at the second surface, a second travel time and a second magnitude of a second acoustic pulse generated by the second acoustic pulse source to thereby form a second response.

7. The method of claim 6, further comprising:
    controlling a kinetic energy of ions of the second ion beam to adjust the second depth of the acoustic pulse source prior to said sending the second ion beam into the structure such that the second depth is different from the depth.

8. The method of claim 7, wherein said controlling a kinetic energy of the ions of the second ion beam comprises at least one of adjusting the ion beam source or inserting attenuators between the ion beam source and the structure.

9. The method of claim 1, wherein the depth is between the first surface and the joint.

10. A joint inspection system comprising:
    an ion beam source directed toward an acoustic sensor and configured to form an acoustic pulse source in a portion of a structure adjacent to a joint at a depth that corresponds to a Bragg peak of an ion beam from the ion beam source, wherein the acoustic sensor is positioned to receive an acoustic pulse formed from energy of the ion beam from the ion beam source; and
    a processor configured to identify, based on at least one of a travel time or a magnitude of the acoustic pulse being outside of an acceptable response, an inconsistency in the joint.

11. The joint inspection system of claim 10, further comprising:
    a beam-steering system configured to change a shape of the ion beam generated by the ion beam source.

12. The joint inspection system of claim 10, wherein the ion beam source is one of a cyclotron, a van de Graff generator, or a linear accelerator.

13. The joint inspection system of claim 10, further comprising:
    attenuators positioned between the ion beam source and a target of the ion beam source.

14. The joint inspection system of claim 10, further comprising:
    a fixture configured to hold the structure to be inspected in a path of the ion beam source and in acoustic contact with the acoustic sensor.

15. The joint inspection system of claim 14, wherein the fixture is configured to place the structure to be inspected into tension.

16. A method of inspecting a joint in a structure, the method comprising:
    repeatedly sending ion beams into a first surface of the structure to form acoustic pulse sources within a first portion of the structure on a first side of the joint, such that each acoustic pulse source of the acoustic pulse sources forms respectively at a depth corresponding to a Bragg peak of an ion beam in the ion beams;
    sensing, at a second surface of a second portion of the structure, respectively a travel time and a magnitude of each acoustic pulse generated by the acoustic pulse sources to thereby form responses, wherein the joint is an interface between the first portion and the second portion of the structure; and
    determining if an inconsistency is present in the joint based on responses identifying at least one of the travel time or the magnitude of each acoustic pulse being outside of an acceptable response.

17. The method of claim 16, further comprising:
    controlling a kinetic energy of ions of each of the ion beams to adjust the depth of each respective acoustic pulse source generated by a respective ion beam prior to said sending each respective ion beam into the structure.

18. The method of claim 17, wherein a kinetic energy of the ions of each of the ion beams is controlled such that the ion beams have at least two different Bragg peaks.

19. The method of claim 16, further comprising:
    establishing the acceptable response using a second structure, of a same design as the structure, that comprises an acceptable quality.

20. The method of claim 16, further comprising:
holding the structure in tension while inspecting the joint.

\* \* \* \* \*